US010569412B1

(12) United States Patent
Reyes

(10) Patent No.: US 10,569,412 B1
(45) Date of Patent: Feb. 25, 2020

(54) MODULAR TOOL STORAGE ASSEMBLY

(71) Applicant: George Reyes, San Fernando, CA (US)

(72) Inventor: George Reyes, San Fernando, CA (US)

( * ) Notice: Subject to any disclaimer, the term of this patent is extended or adjusted under 35 U.S.C. 154(b) by 0 days.

(21) Appl. No.: 16/281,209

(22) Filed: Feb. 21, 2019

(51) Int. Cl.
B25H 3/00 (2006.01)
B25H 3/02 (2006.01)
B62B 1/16 (2006.01)
B62B 1/14 (2006.01)
B62B 5/06 (2006.01)
B62B 1/12 (2006.01)
A45C 13/02 (2006.01)

(52) U.S. Cl.
CPC ............. *B25H 3/021* (2013.01); *A45C 13/02* (2013.01); *B62B 1/125* (2013.01); *B62B 1/14* (2013.01); *B62B 1/16* (2013.01); *B62B 5/067* (2013.01); *B62B 2202/48* (2013.01)

(58) Field of Classification Search
CPC .. B25H 3/021; B25H 3/00; B25H 3/02; B62B 1/14; B62B 1/16; B62B 1/12; B62B 1/125; A45C 13/02
See application file for complete search history.

(56) References Cited

U.S. PATENT DOCUMENTS

| 4,523,702 | A | * | 6/1985 | Viio | A45F 5/00 206/479 |
| 5,370,288 | A | * | 12/1994 | Field | A45C 13/02 211/60.1 |
| 5,423,404 | A | * | 6/1995 | Shaw | A45C 3/00 190/102 |
| 5,769,260 | A | * | 6/1998 | Killinger | A45C 13/005 220/4.23 |
| 6,935,641 | B2 | | 8/2005 | Hahn | |
| 6,942,095 | B2 | | 9/2005 | Chen | |
| 7,314,133 | B2 | * | 1/2008 | Redzisz | A45C 13/04 206/373 |
| 7,334,680 | B2 | | 2/2008 | Cunningham et al. | |
| D630,851 | S | | 1/2011 | Landau | |
| 8,875,883 | B2 | * | 11/2014 | Kinskey | B25H 3/021 206/373 |
| 9,227,316 | B2 | | 1/2016 | Stevens | |
| 2004/0016666 | A1 | * | 1/2004 | Redzisz | A45C 13/04 206/372 |
| 2004/0026294 | A1 | * | 2/2004 | Platte, III | A45C 5/065 206/575 |
| 2006/0011502 | A1 | * | 1/2006 | Redzisz | A45C 13/04 206/373 |

(Continued)

FOREIGN PATENT DOCUMENTS

DE 29502574 U1 * 4/1995 ............. B25H 3/021

Primary Examiner — Kimberley S Wright

(57) ABSTRACT

A modular tool storage assembly for organizing and transporting tools includes a case and a lid that is hingedly coupled to the case for opening and closing the case. A pair of support rails is each positionable in the case having each of the support rails being spaced apart from each other. A plurality of storage units is provided and each of the storage units has a plurality of elastic compartments attached thereto. Each of the elastic storage compartments on each of the storage units can store a respective tool. A selected number of the storage units are positionable to releasably engage the support rails having the selected number of storage units being vertically oriented in the case. In this way the storage units and the case can both organize and transport the tools.

5 Claims, 12 Drawing Sheets

(56) References Cited

U.S. PATENT DOCUMENTS

| | | | |
|---|---|---|---|
| 2007/0062839 A1* | 3/2007 | Patterson | B25H 3/02 206/523 |
| 2010/0052276 A1 | 3/2010 | Brunner | |
| 2013/0186794 A1* | 7/2013 | Kinskey | B25H 3/00 206/372 |
| 2013/0199952 A1* | 8/2013 | Kinskey | B25H 3/021 206/372 |
| 2016/0023349 A1* | 1/2016 | Hoppe | A45C 7/0045 280/655.1 |

\* cited by examiner

MODULAR TOOL STORAGE ASSEMBLY

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to storage devices and more particularly pertains to a new storage device for organizing and transporting tools.

BRIEF SUMMARY OF THE INVENTION

An embodiment of the disclosure meets the needs presented above by generally comprising a case. A lid is hingedly coupled to the case for opening and closing the case. A pair of support rails is each positionable in the case having each of the support rails being spaced apart from each other. A plurality of storage units is provided and each of the storage units has a plurality of elastic compartments attached thereto. Each of the elastic storage compartments on each of the storage units can store a respective tool. A selected number of the storage units are positionable to releasably engage the support rails having the selected number of storage units being vertically oriented in the case. In this way the storage units and the case can both organize and transport the tools.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
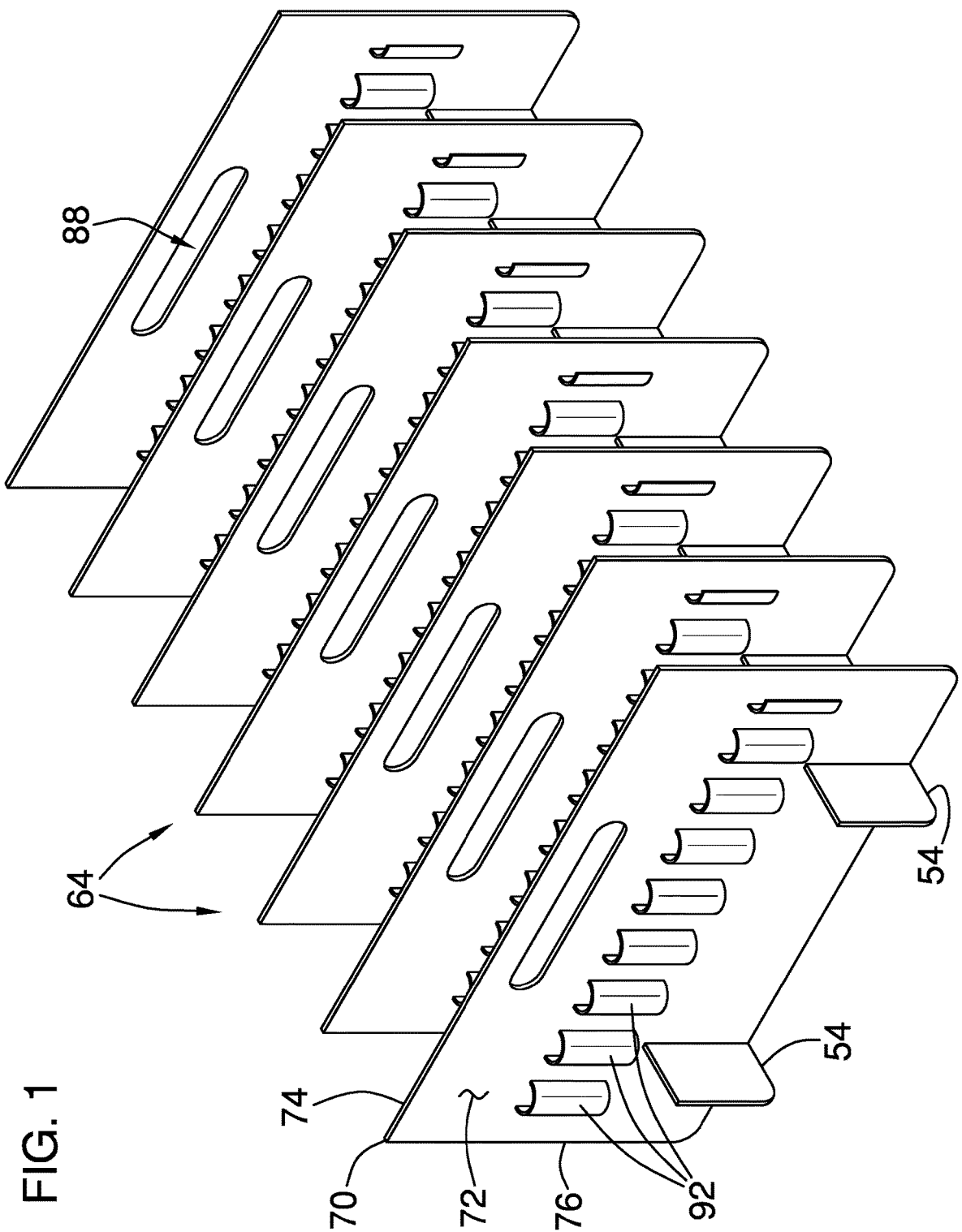
FIG. 1 is a top perspective view of a plurality of storage units and a pair of support rails of a modular tool storage assembly according to an embodiment of the disclosure.
Figure 2:
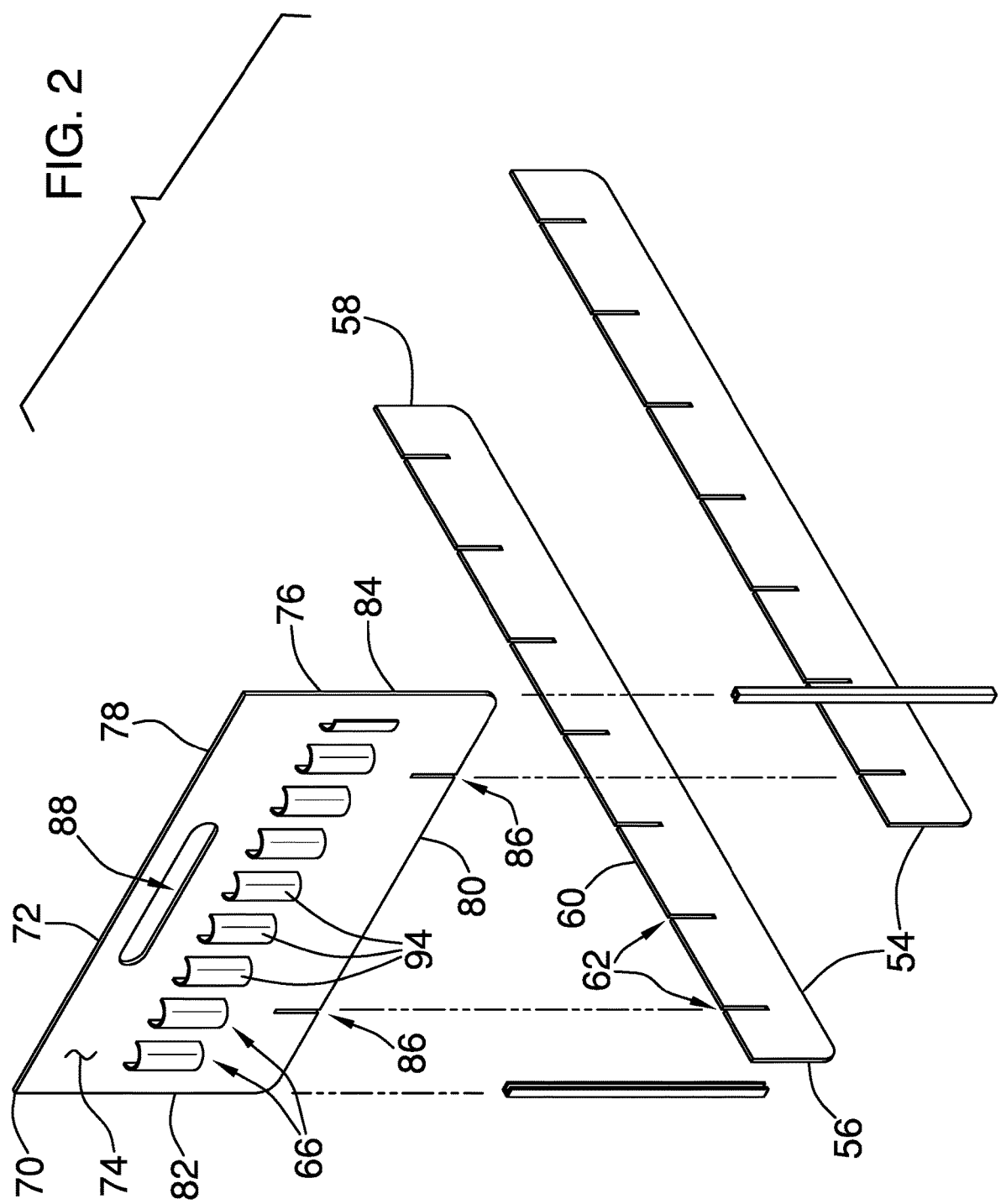
FIG. 2 is an exploded view of an embodiment of the disclosure.
Figure 3:
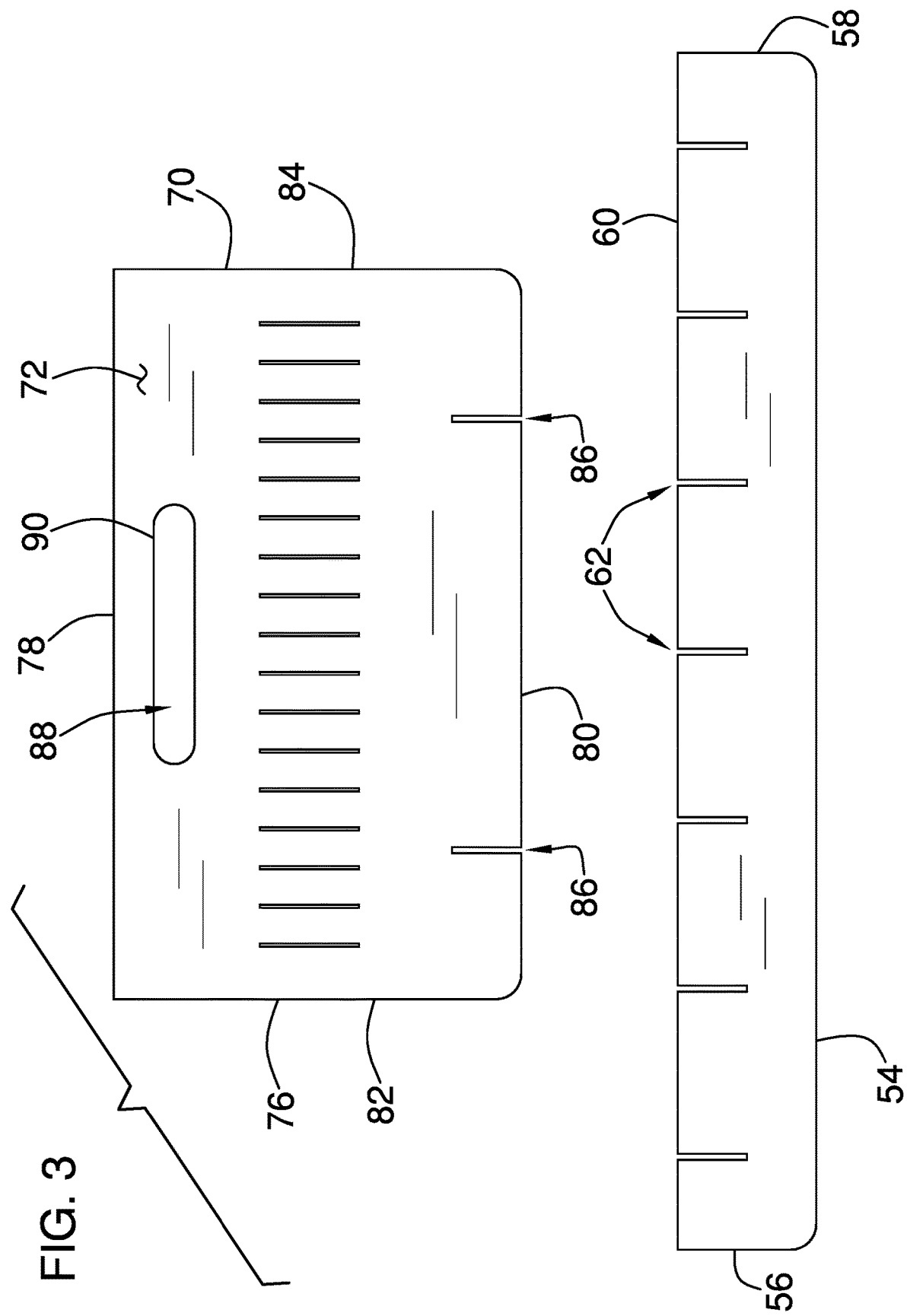
FIG. 3 is a front view of storage unit and a support rail of an embodiment of the disclosure.
Figure 4:
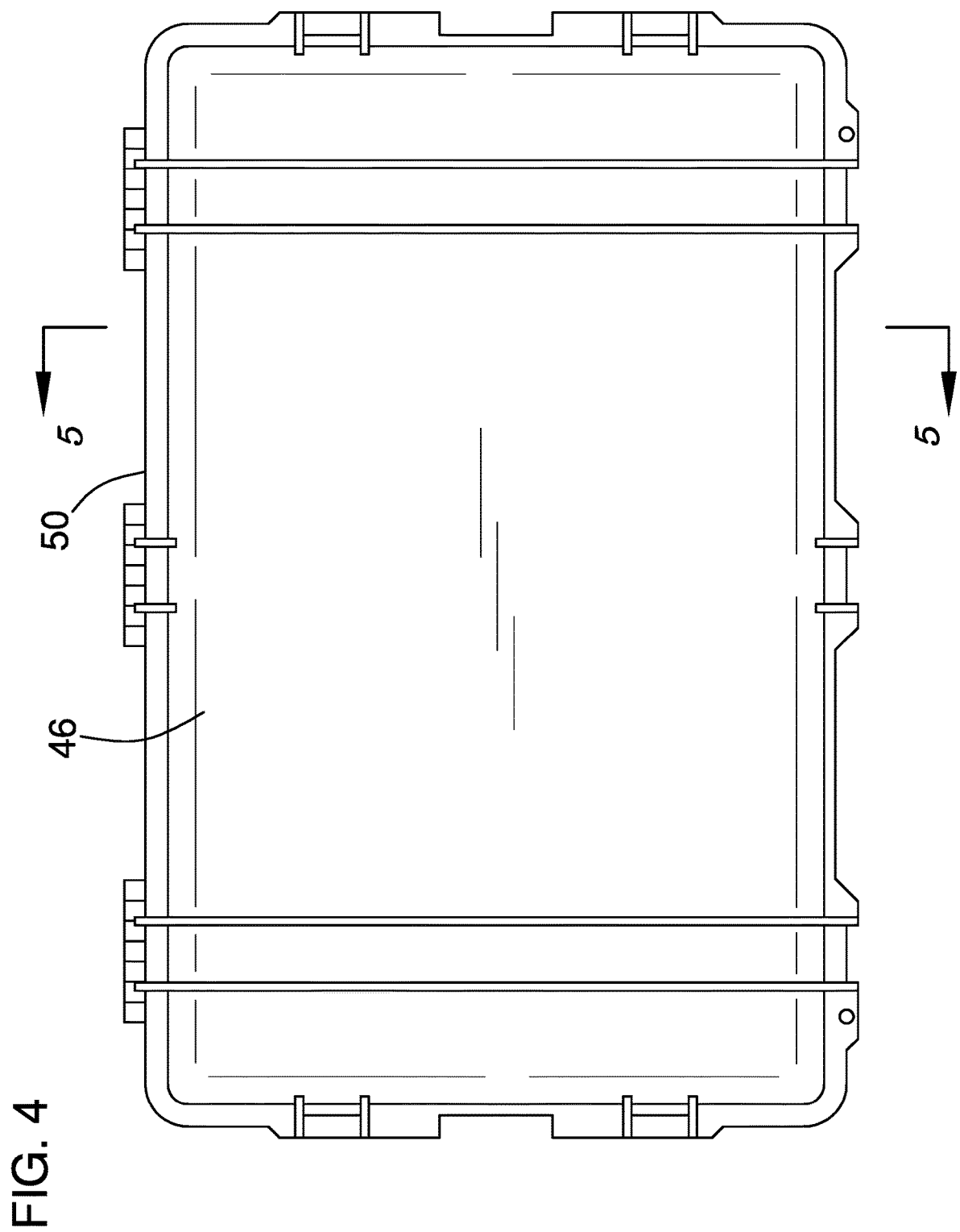
FIG. 4 is a top view of case of an embodiment of the disclosure.
Figure 5:
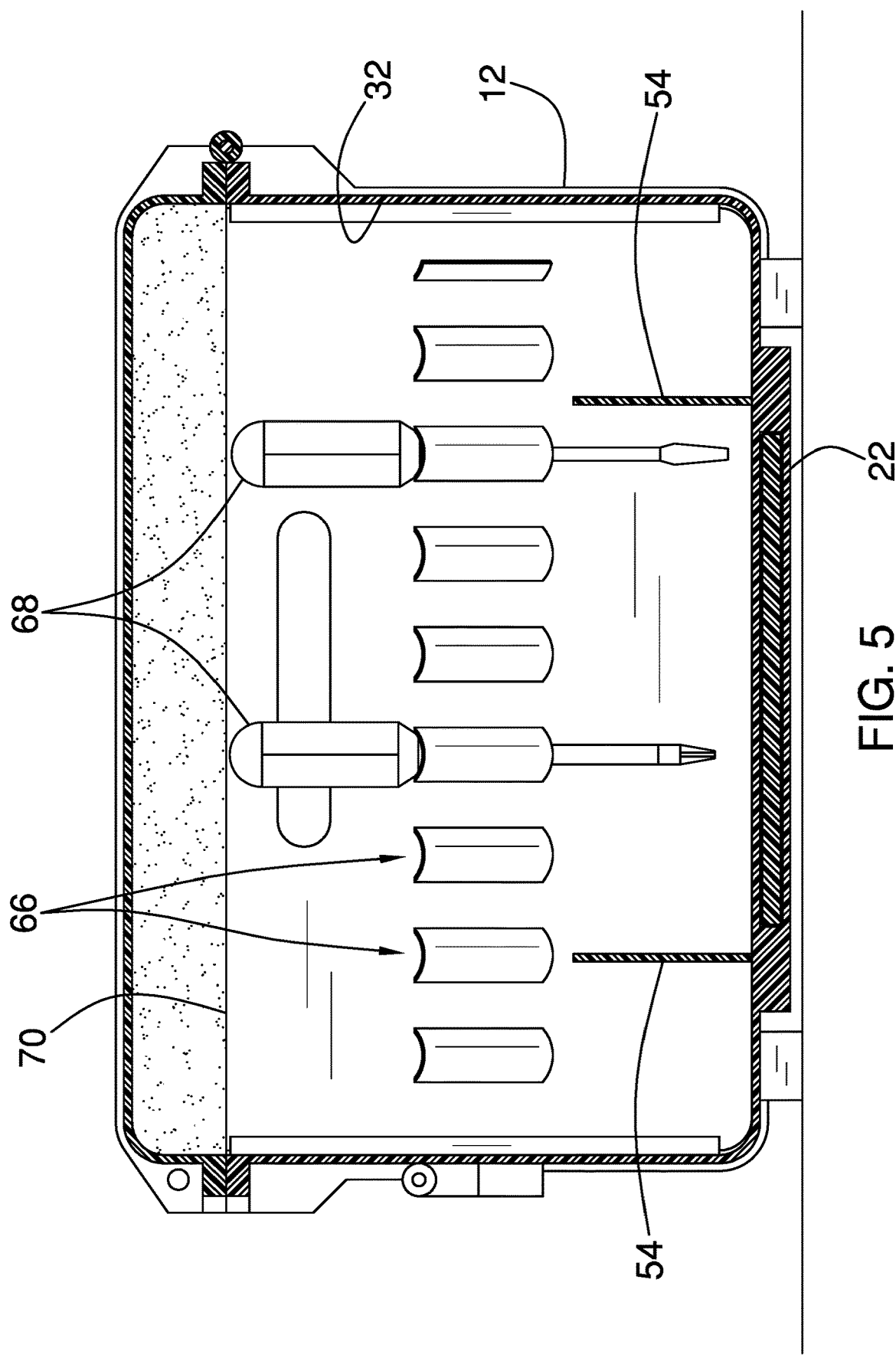
FIG. 5 is a cross sectional view taken along line 5-5 of FIG. 4 of an embodiment of the disclosure.
Figure 6:
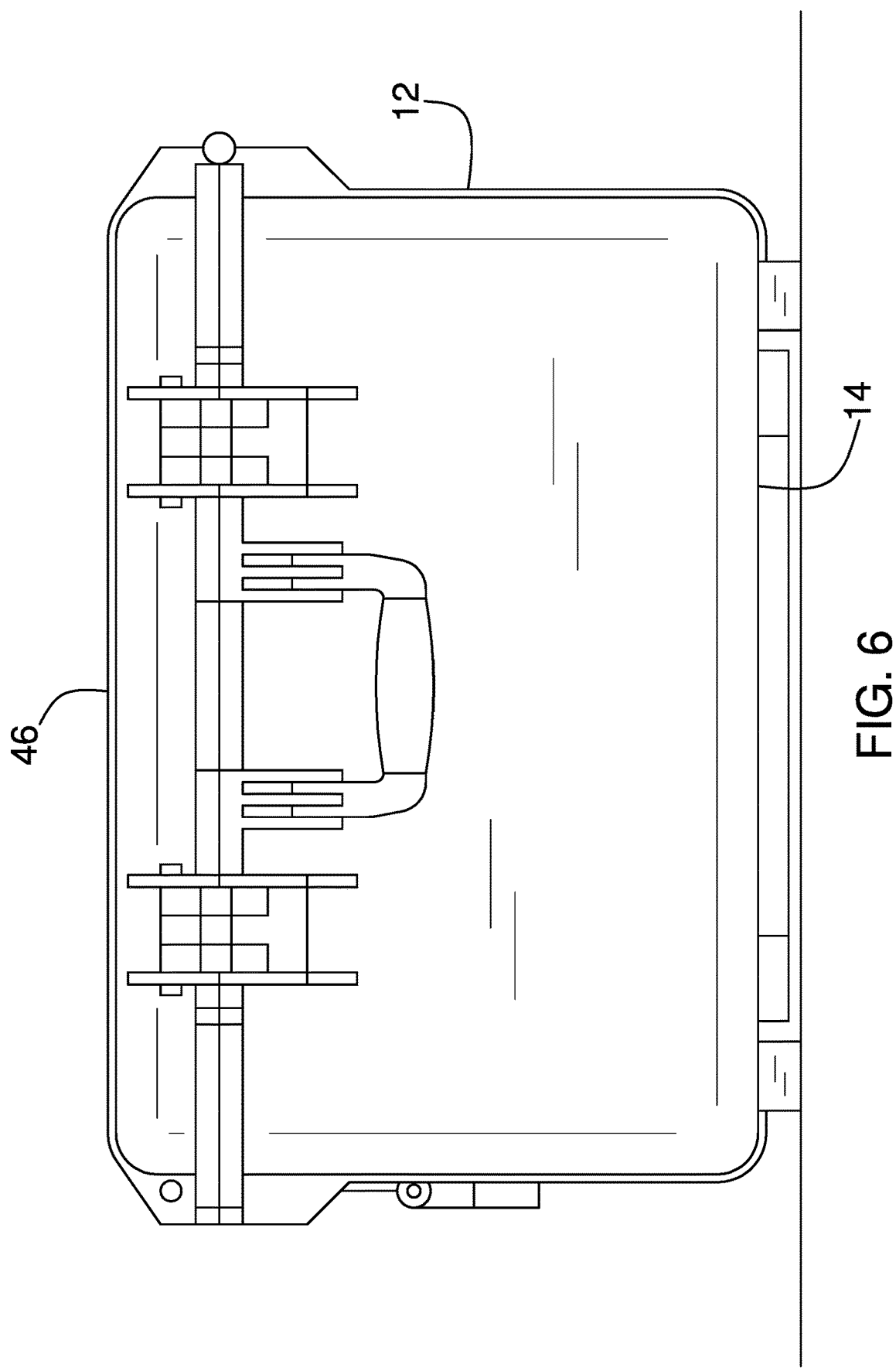
FIG. 6 is a right side view of a case of an embodiment of the disclosure.
Figure 7:
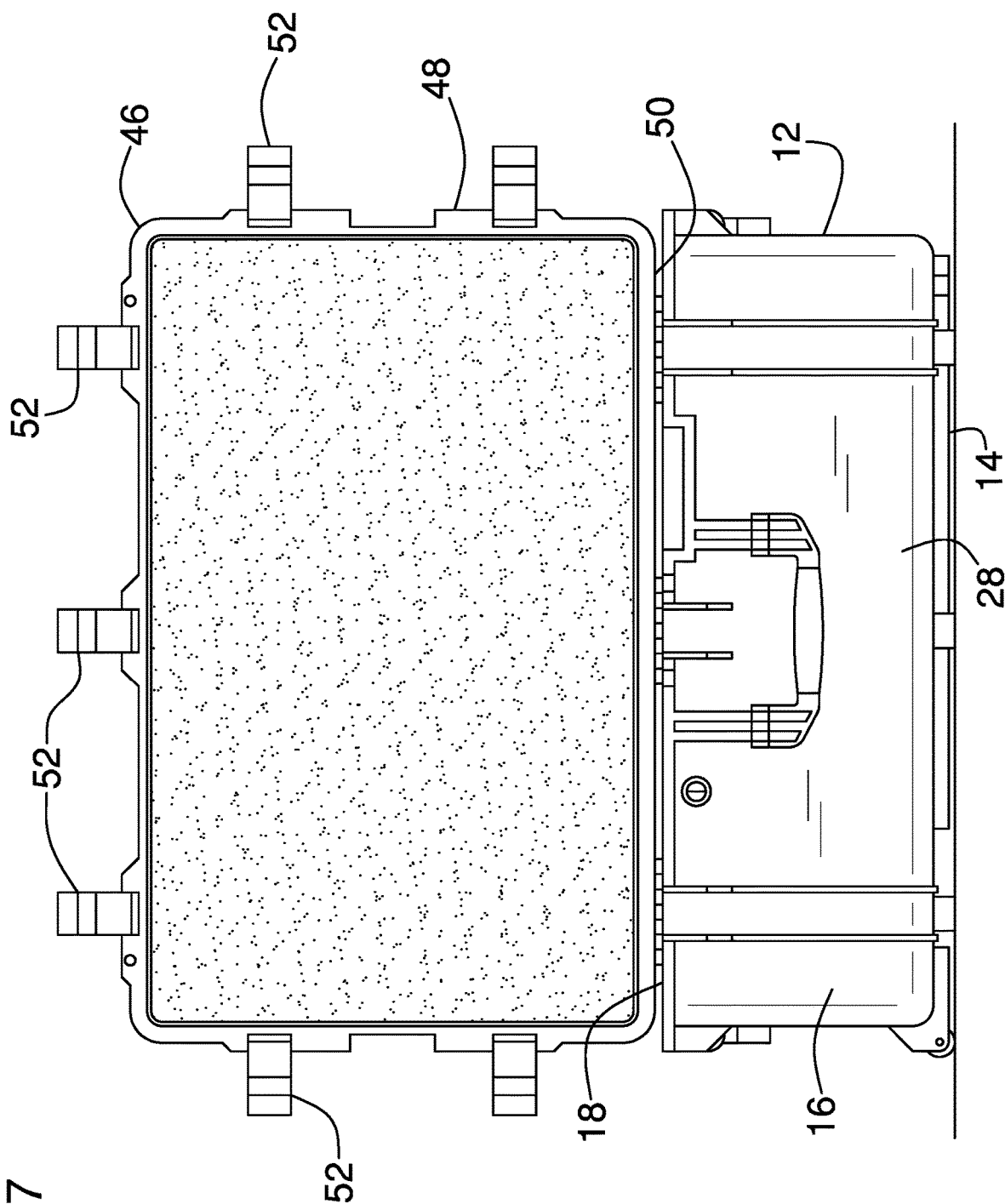
FIG. 7 is a front view of a case of an embodiment of the disclosure showing a lid in an open position.
Figure 8:
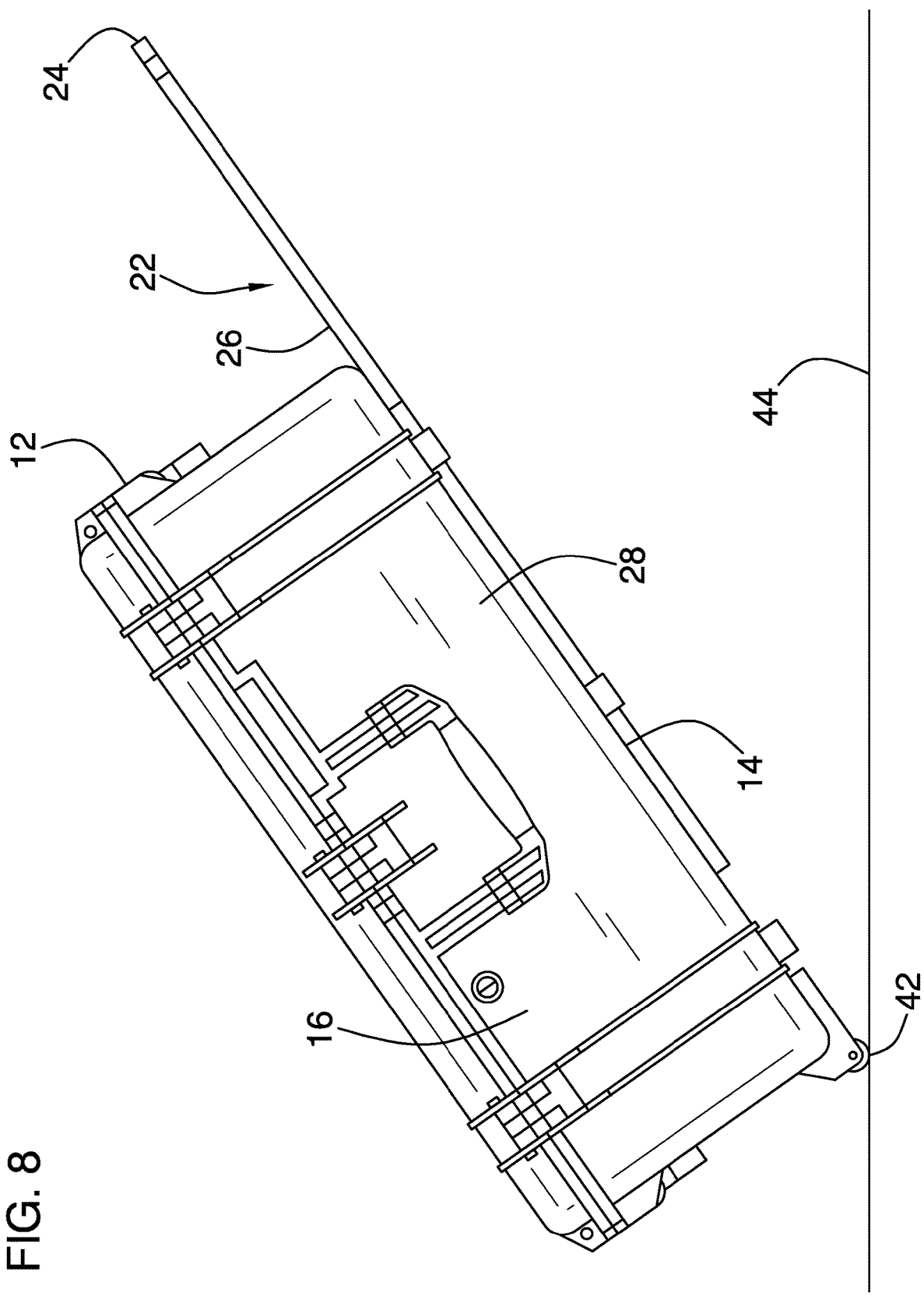
FIG. 8 is a perspective in-use view of an embodiment of the disclosure being rolled along a support surface.
Figure 9:
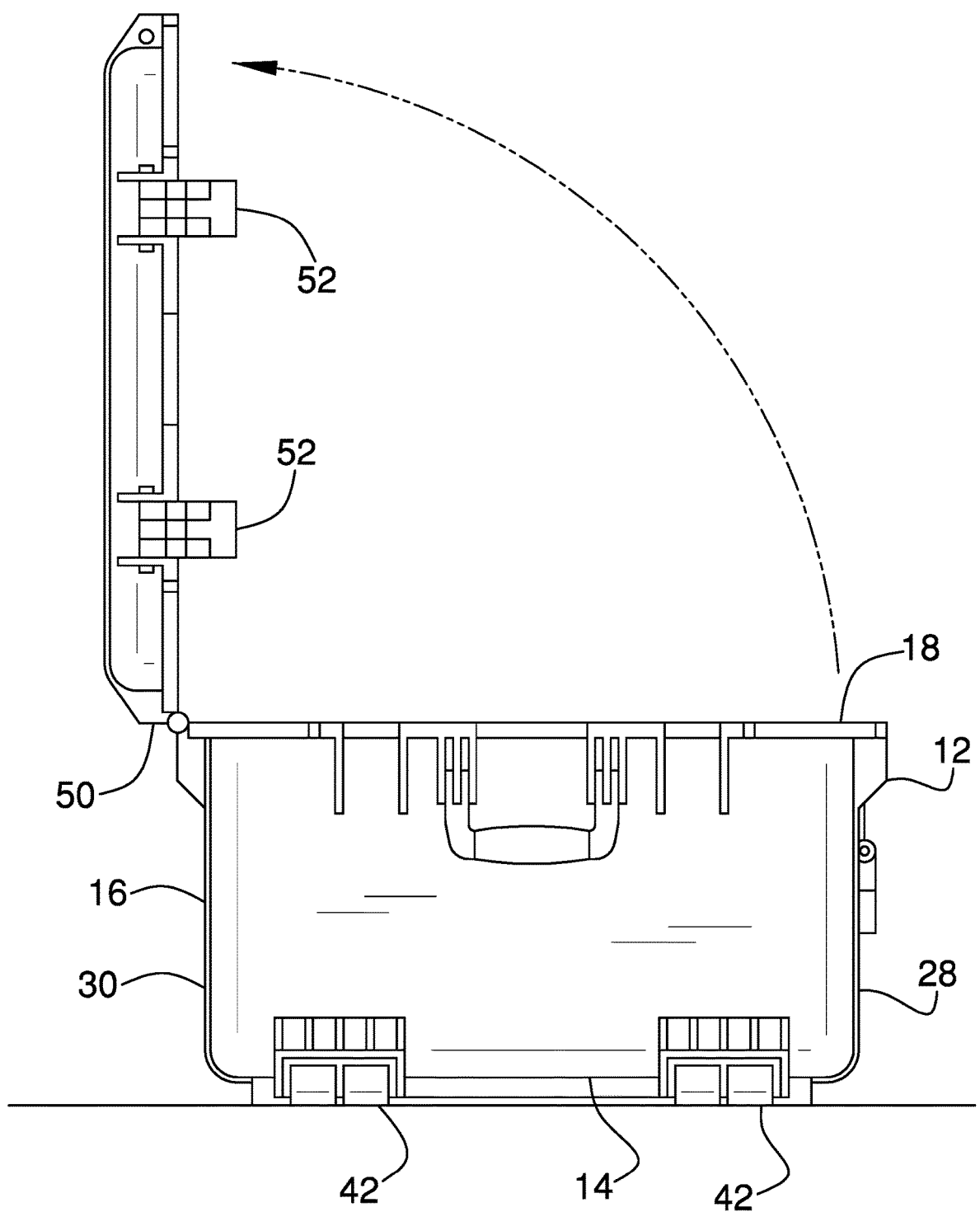
FIG. 9 is a left side view of a case of an embodiment of the disclosure.
Figure 10:
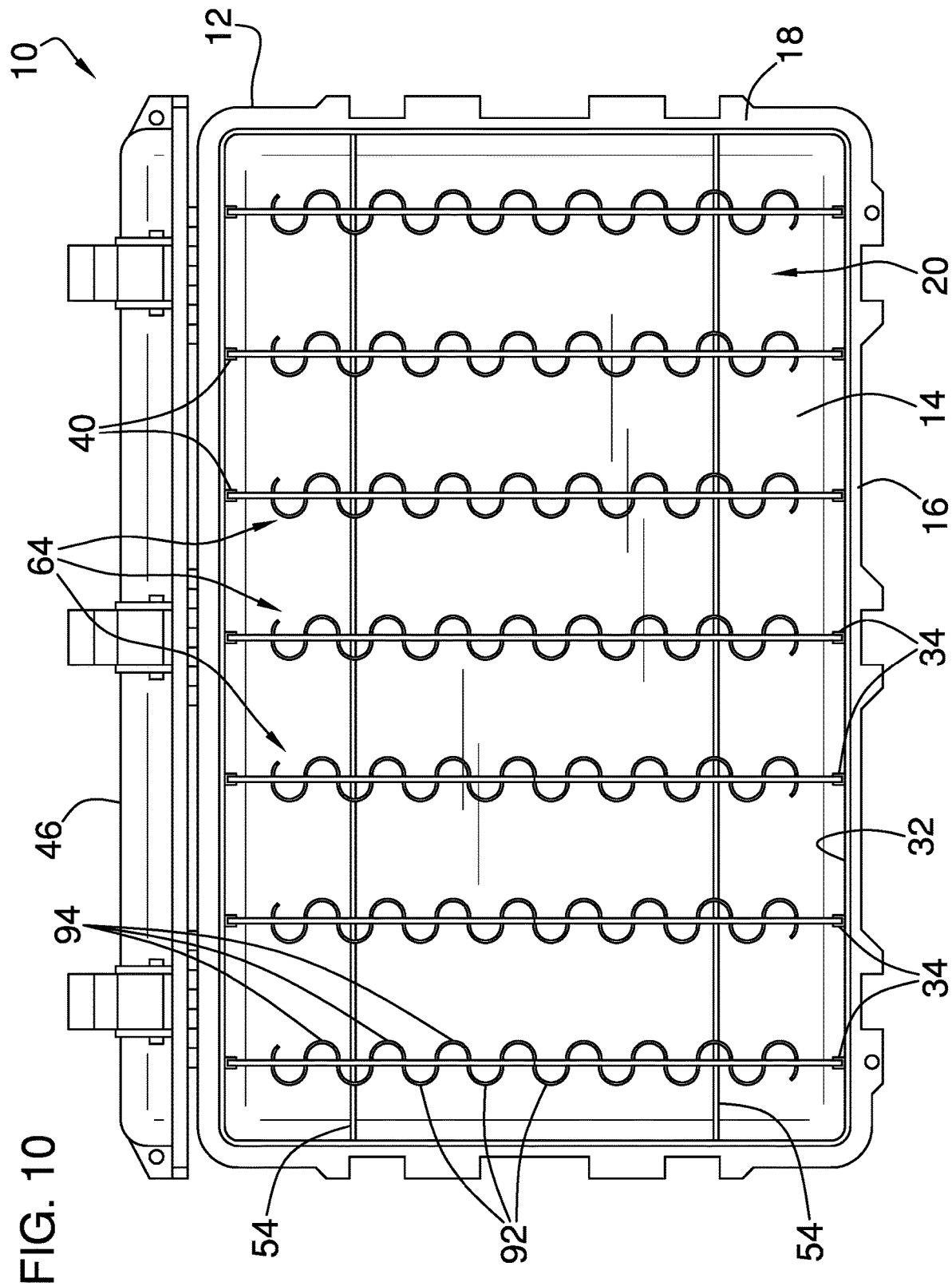
FIG. 10 is a top view of a case of an embodiment of the disclosure showing a plurality of storage units being positioned in said case.
Figure 11:
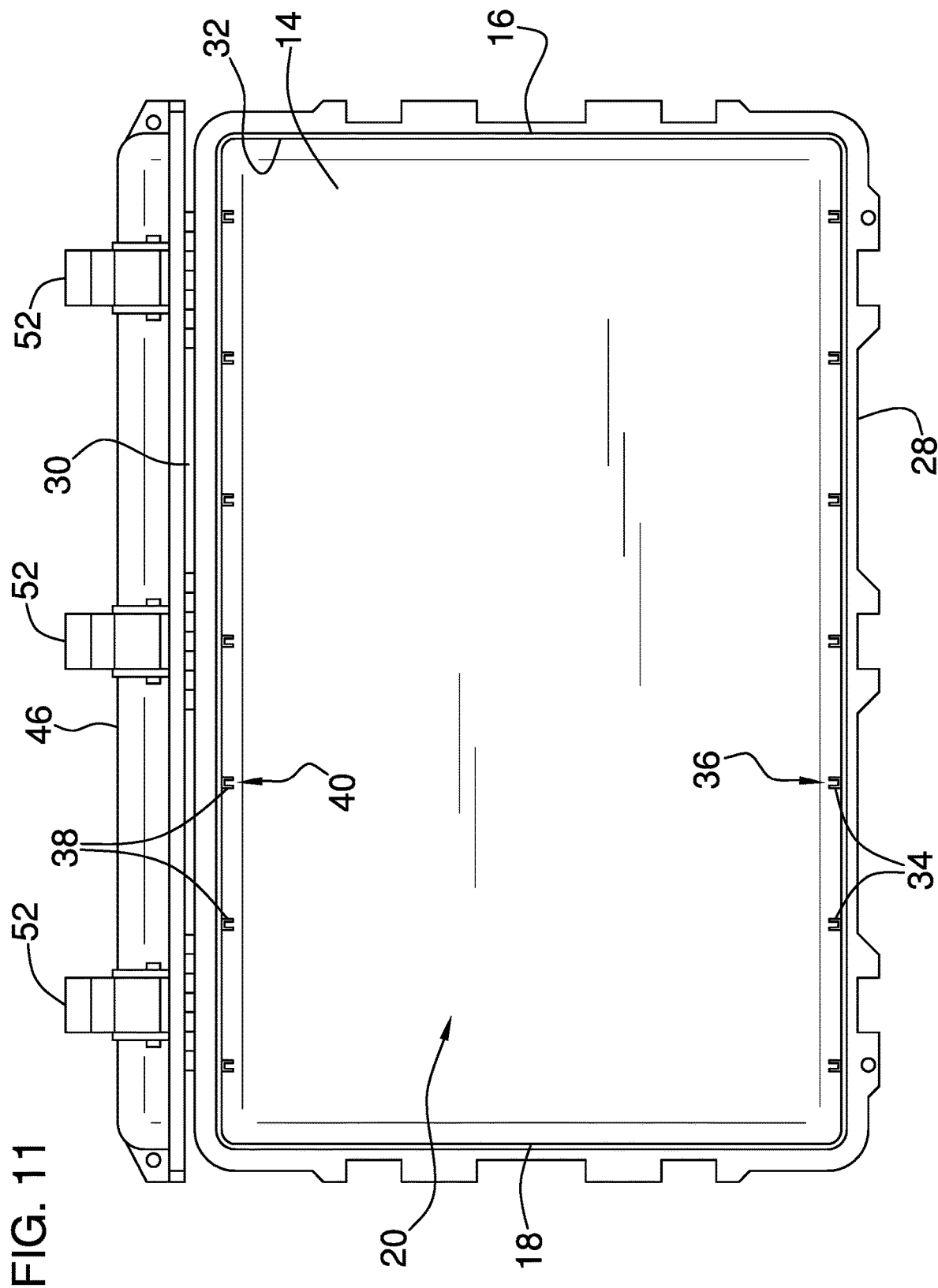
FIG. 11 is top view of a case of an embodiment of the disclosure showing a lid being open.
Figure 12:
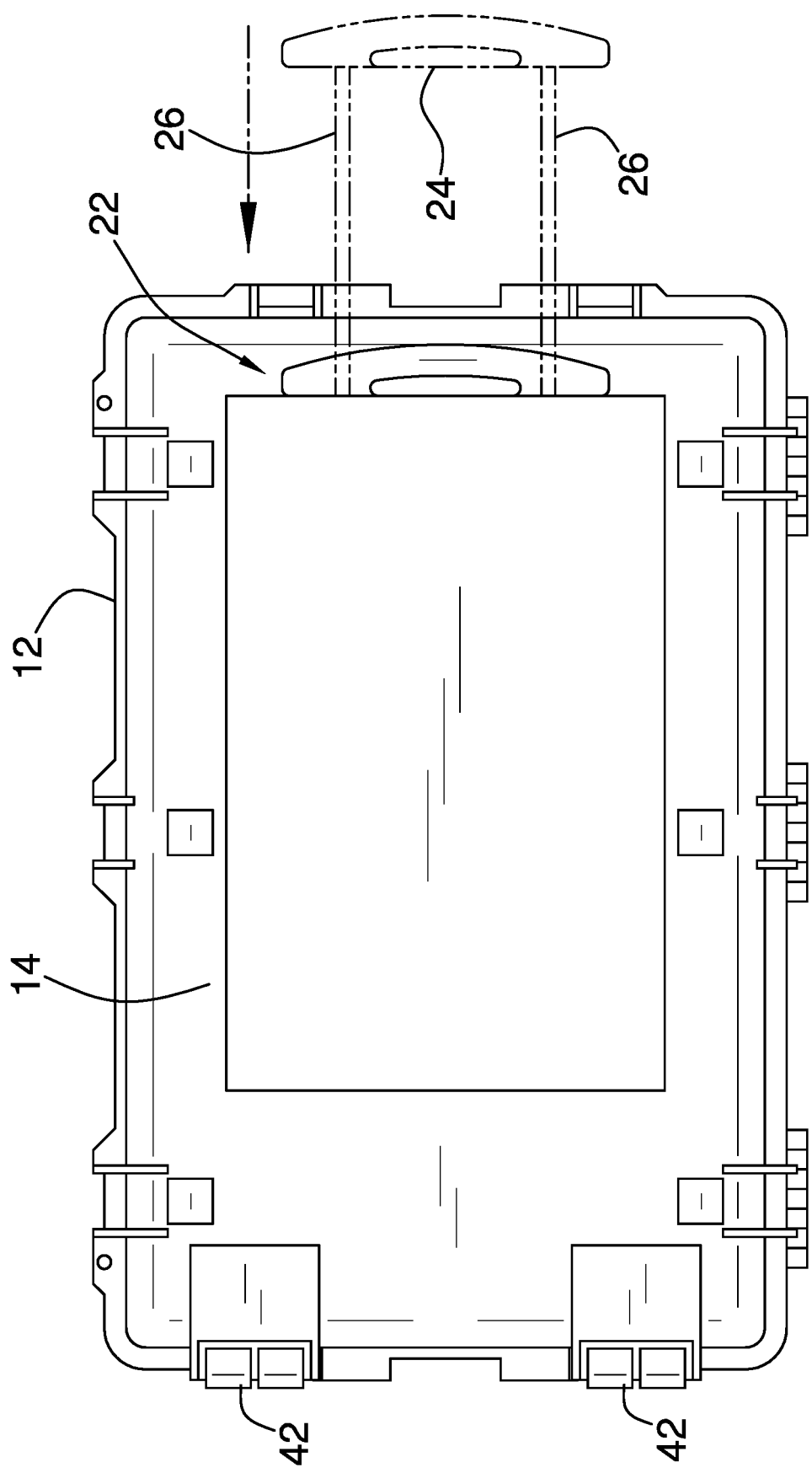
FIG. 12 is a bottom view of a case of an embodiment of the disclosure.

With reference now to the drawings, and in particular to FIGS. 1 through 12 thereof, a new storage device embodying the principles and concepts of an embodiment of the disclosure and generally designated by the reference numeral 10 will be described.

As best illustrated in FIGS. 1 through 12, the modular tool storage assembly 10 generally comprises a case 12 that has a lower wall 14 and a perimeter wall 16 extending upwardly therefrom. The perimeter wall 16 has a distal edge 18 with respect to the lower wall 14 defining an opening 20 into the case 12. The case 12 is comprised of a rigid and lightweight material, such as high impact plastic or the like. A handle 22 is slidably coupled to the case 12 for positioning between a stored position and a deployed position. The handle 22 comprises a grip 24 extending between a pair of rods 26, and each of the rods 26 slidably engages the perimeter wall 16 of the case 12. The grip 24 rests against the case 12 when the handle 22 is in the stored position. Additionally, the grip 24 is spaced from the case 12 when the handle 22 is positioned in the deployed position.

The perimeter wall 16 of the case 12 has a front side 28, a back side 30 and an inside surface 32. A plurality of first engagements 34 is each coupled to the inside surface 32 of the front side 28 of the perimeter wall 16 of the case 12. Each of the first engagements 34 is vertically oriented and each of the first engagements 34 has a groove 36 therein. The groove 36 in each of the first engagements 34 extends along the full length of the first engagements 34. A plurality of second engagements 38 is each coupled to the inside surface 32 of the back side 30 of the perimeter wall 16 of the case 12. Each of the second engagements 38 is vertically oriented and each of the second engagements 38 has a groove 40 therein. The groove 40 in each of the second engagements 38 extends along the full length of the second engagements 38. Moreover, each of the second engagements 38 is aligned with a respective one of the first engagements 34.

A pair of rollers 42 is each of the rollers 42 is rotatably coupled to the case 12 for rolling along a support surface 44. Each of the rollers 42 is positioned on the lower wall 14 of the case 12 and each of the rollers 42 is aligned with an intersection between the lower wall 14 and the perimeter wall 16. Moreover, each of the rollers 42 is positioned on an opposite side of the case 12 with respect to the handle 22. Thus, the case 12 is tilted upwardly onto each of the rollers 42 when the handle 22 is positioned in the deployed position and the grip 24 is gripped. In this way the case 12 can be pulled to roll along the support surface 44.

A lid 46 is hingedly coupled to the case 12 for opening 20 and closing the case 12. The lid 46 has a perimeter edge 48, the perimeter edge 48 has a back side 50, and the back side 50 is hingedly coupled to the distal edge 18 of the perimeter wall 16 of the case 12. A plurality of locks 52 is each movably coupled to the lid 46. Each of the locks 52 engages the perimeter wall 16 of the case 12 when the lid 46 is closed and each of the locks 52 is positioned in a locked position for retaining the lid 46 in the closed position. Additionally, each of the locks 52 disengages the perimeter wall 16 of the case 12 when the locks 52 are positioned in an unlocked position for opening 20 the lid 46. Each of the locks 52 may comprise hinged clamps or other type of mechanical, releasable lock.

A pair of support rails 54 is each positionable in the case 12 having each of the support rails 54 being spaced apart from each other. Additionally, the support rails 54 are longitudinally oriented in the case 12. Each of the support rails 54 has a first end 56, a second end 58 and an upper edge 60 extending therebetween, and each of the support rails 54 is elongated between the first 56 and second 58 ends. The upper edge 60 of each of the support rails 54 has a plurality of rail slots 62 each extending downwardly therein. Additionally, the rail slots 62 on a respective one of the support rails 54 are spaced apart from each other and are distributed between the first 56 and second 58 ends of the respective support rail 54. Each of the support rails 54 is positioned to extend longitudinally along the lower wall 14 of the case 12 having the upper edge 60 of each of the support rails 54 facing upwardly.

A plurality of storage units 64 is provided and each of the storage units 64 has a plurality of elastic compartments 66 attached thereto. Each of the elastic storage compartments 66 on each of the storage units 64 can store a respective tool 68. The tool 68 might be a hand tool such as a screwdriver, a wrench or any other kind of tool. A selected number of the storage units 64 are positionable to releasably engage the support rails 54 having the selected number of storage units 64 being vertically oriented in the case 12. In this way the storage units 64 and the case 12 can organize and transport a plurality of tools.

Each of the storage units 64 comprises a panel 70 that has a first surface 72, a second surface 74 and a perimeter edge 76 extending therebetween, and the perimeter edge 76 of the panel 70 has a top side 78, a bottom side 80, a first lateral side 82 and a second lateral side 84. The bottom side 80 has a pair of panel slots 86 each extending upwardly toward the top side 78. The panel slots 86 are spaced apart from each other and are distributed between the first 82 and second 84 lateral sides. Additionally, each of the panel slots 86 engages a respective one of a respective pair of the rail slots 62 in each of the support rails 54 has the panel 70 being vertically oriented in the case 12. The panel 70 has an aperture 88 extending through the first 72 and second 74 surfaces, the aperture 88 is longitudinally elongated to define a handle 90 for gripping the panel 70 and the aperture 88 is spaced from the top side 78.

The plurality of elastic compartments 66 includes a plurality of first sleeves 92 that is each coupled to the first surface 72 of the panel 70. Each of the first sleeves 92 can have a respective tool 68 extended therethrough for storage. Each of the first sleeves 92 is oriented to extend between the top side 78 and the bottom side 80 of the perimeter edge 48 of the panel 70. Additionally, the first sleeves 92 are spaced apart from each other and are distributed between the first 82 and second 84 lateral sides of the perimeter edge 76 of the panel 70. Each of the first sleeves 92 is comprised of a resiliently stretchable material to compress against the respective tool 68 for retaining the respective tool 68 in the first sleeve 92.

The plurality of elastic compartments 66 includes a plurality of second sleeves 94 that is each coupled to the second surface 74 of the panel 70. Each of the second sleeves 94 can have a respective tool 68 extended therethrough for storage. Each of the second sleeves 94 is oriented to extend between the top side 78 and the bottom side 80 of the perimeter edge 48 of the panel 70. Additionally, the second sleeves 94 are spaced apart from each other and are distributed between the first 82 and second 84 lateral sides of the perimeter edge 76 of the panel 70. Each of the second sleeves 94 is comprised of a resiliently stretchable material compress against the respective tool 68 and thusly retains the respective tool 68 in the second sleeve 94.

In use, each of the support rails 54 is positioned on the lower wall 14 of the case 12 and the panel 70 of each of the storage units 64 is positioned in the respective pair of rail slots 62. Additionally, the panel 70 of each of the storage units 64 slidably engages the groove 36,40 in respective ones of the first 34 and second 38 engagements. In this way the panel 70 of each of the storage units 64 is inhibited from tipping within the case 12. The tools 68 are each slid into selected ones of the first 92 or second 94 sleeves on the panel 70 of each of the storage units 64. In this way a multitude of various tools 68, each having various sizes and shapes, can be vertically organized and stored. Moreover, the lid 46 can be locked closed, the handle 22 can be deployed and the grip 24 can be gripped to roll the case 12 along the support surface 44. In this way the multitude of tools 68 can be easily transported.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A modular tool storage assembly for storing a selectable number of tools in a vertical orientation, said assembly comprising:

a case, said case having a lower wall and a perimeter wall extending upwardly therefrom, said perimeter wall having a distal edge with respect to said lower wall defining an opening into said case;

a handle being slidably coupled to said case for positioning between a stored position and a deployed position, said handle comprising a grip extending between a pair of rods, each of said rods slidably engaging said perimeter wall of said case, said grip resting against said case when said handle is in said stored position, said grip being spaced from said case when said handle is positioned in said deployed position;

a pair of rollers, each of said rollers being rotatably coupled to said case for rolling along a support surface, each of said rollers being positioned on said lower wall of said case, each of said rollers being aligned with an intersection between said lower wall and said perimeter wall, each of said rollers being positioned on an opposite side of said case with respect to said handle such that said case is tilted upwardly onto each of said rollers when said handle is positioned in said deployed position and said grip is gripped wherein said case is configured to be rolled along the support surface;

a lid being hingedly coupled to said case for opening and closing said case, said lid having a perimeter edge, said perimeter edge having a back side, said back side being hingedly coupled to said distal edge of said perimeter wall of said case;

a pair of support rails, each of said support rails being positionable in said case having each of said support rails being spaced apart from each other, each of said support rails having a first end, a second end and an upper edge extending therebetween, each of said support rails being elongated between said first and second ends, said upper edge of each of said support rails having a plurality of rail slots each extending downwardly therein, said rail slots on a respective one of said support rails being spaced apart from each other and being distributed between said first and second ends of said respective support rail, each of said support rails being positioned to extend longitudinally along said lower wall of said case having said upper edge of each of said support rails facing upwardly; and a plurality of storage units, each of said storage units having a plurality of elastic compartments being attached thereto wherein each of said elastic storage compartments on each of said storage units is configured to store a respective tool, a selected number of said storage units being positionable to releasably engage said support rails having said selected number of storage units being vertically oriented in said case wherein said storage units and said case are configured to organize and transport the tools, each of said storage units comprising a panel having a first surface, a second surface and a perimeter edge extending therebetween, said perimeter edge having a top side, a bottom side, a first lateral side and a second lateral side, said bottom side having a pair of panel slots each extending upwardly toward said top side, said panel slots being spaced apart from each other and being distributed between said first and second lateral sides, each of said panels slots engaging a respective one of a respective pair of said rail slots in each of said support rails having said panel being vertically oriented in said case, said panel has an aperture extending through said first and second surfaces, said aperture being longitudinally elongated to define a handle for gripping said panel, said aperture being spaced from said top side.

2. The assembly according to claim 1, further comprising a plurality of locks, each of said locks being movably coupled to said lid, each of said locks engaging said perimeter wall of said case when said lid is closed and each of said locks is positioned in a locked position for retaining said lid in said closed position, each of said locks disengaging said perimeter wall of said case when said locks are positioned in an unlocked position for opening said lid.

3. The assembly according to claim 1, further comprising a plurality of first sleeves, each of said first sleeves being coupled to said first surface of said panel wherein each of said first sleeves is configured to have a respective tool extended therethrough for storage, each of said first sleeves being oriented to extend between said top side and said bottom side of said perimeter edge of said panel, said first sleeves being spaced apart from each other and being distributed between said first and second lateral sides of said perimeter edge of said panel, each of said first sleeves being comprised of a resiliently stretchable material wherein each of said first sleeves is configured to compress against the respective tool to retain the respective tool in said first sleeve.

4. The assembly according to claim 3, further comprising a plurality of second sleeves, each of said second sleeves being coupled to said second surface of said panel wherein each of said second sleeves is configured to have a respective tool extended therethrough for storage, each of said second sleeves being oriented to extend between said top side and said bottom side of said perimeter edge of said panel, said second sleeves being spaced apart from each other and being distributed between said first and second lateral sides of said perimeter edge of said panel, each of said second sleeves being comprised of a resiliently stretchable material wherein each of said second sleeves is configured to compress against the respective tool to retain the respective tool in said second sleeve.

5. A modular tool storage assembly for storing a selectable number of tools in a vertical orientation, said assembly comprising:

a case having a lower wall and a perimeter wall extending upwardly therefrom, said perimeter wall having a distal edge with respect to said lower wall defining an opening into said case;

a handle being slidably coupled to said case for positioning between a stored position and a deployed position, said handle comprising a grip extending between a pair of rods, each of said rods slidably engaging said perimeter wall of said case, said grip resting against said case when said handle is in said stored position, said grip being spaced from said case when said handle is positioned in said deployed position;

a pair of rollers, each of said rollers being rotatably coupled to said case for rolling along a support surface, each of said rollers being positioned on said lower wall of said case, each of said rollers being aligned with an intersection between said lower wall and said perimeter wall, each of said rollers being positioned on an opposite side of said case with respect to said handle such that said case is tilted upwardly onto each of said rollers when said handle is positioned in said deployed position and said grip is gripped wherein said case is configured to be rolled along the support surface;

a lid being hingedly coupled to said case for opening and closing said case, said lid having a perimeter edge, said perimeter edge having a back side, said back side being hingedly coupled to said distal edge of said perimeter wall of said case;

a plurality of locks, each of said locks being movably coupled to said lid, each of said locks engaging said perimeter wall of said case when said lid is closed and each of said locks is positioned in a locked position for retaining said lid in said closed position, each of said locks disengaging said perimeter wall of said case when said locks are positioned in an unlocked position for opening said lid;

a pair of support rails, each of said support rails being positionable in said case having each of said support rails being spaced apart from each other, each of said support rails having a first end, a second end and an upper edge extending therebetween, each of said support rails being elongated between said first and second ends, said upper edge of each of said support rails having a plurality of rail slots each extending downwardly therein, said rail slots on a respective one of said support rails being spaced apart from each other and being distributed between said first and second ends of said respective support rail, each of said support rails being positioned to extend longitudinally along said lower wall of said case having said upper edge of each of said support rails facing upwardly; and a plurality of storage units, each of said storage units having a plurality of elastic compartments being attached thereto wherein each of said elastic storage compartments on each of said storage units is configured to store a respective tool, a selected number of said storage units being positionable to releasably engage said support rails having said selected number of storage units being vertically oriented in said case wherein said storage units and said case are configured to organize and transport the tools, each of said storage units comprising:

a panel having a first surface, a second surface and a perimeter edge extending therebetween, said perimeter edge having a top side, a bottom side, a first lateral side and a second lateral side, said bottom side having a pair of panel slots each extending upwardly toward said top side, said panel slots being spaced apart from each other and being distributed between said first and second lateral sides, each of said panels slots engaging a respective one of a respective pair of said rail slots in each of said support rails having said panel being vertically oriented in said case, said panel having an aperture extending through said first and second surfaces, said aperture being longitudinally elongated to define a handle for gripping said panel, said aperture being spaced from said top side;

a plurality of first sleeves, each of said first sleeves being coupled to said first surface of said panel wherein each of said first sleeves is configured to have a respective tool extended therethrough for storage, each of said first sleeves being oriented to extend between said top side and said bottom side of said perimeter edge of said panel, said first sleeves being spaced apart from each other and being distributed between said first and second lateral sides of said perimeter edge of said panel, each of said first sleeves being comprised of a resiliently stretchable material wherein each of said first sleeves is configured to compress against the respective tool to retain the respective tool in said first sleeve; and a plurality of second sleeves, each of said second sleeves being coupled to said second surface of said panel wherein each of said second sleeves is configured to have a respective tool extended therethrough for storage, each of said second sleeves being oriented to extend between said top side and said bottom side of said perimeter edge of said panel, said second sleeves being spaced apart from each other and being distributed between said first and second lateral sides of said perimeter edge of said panel, each of said second sleeves being comprised of a resiliently stretchable material wherein each of said second sleeves is configured to compress against the respective tool to retain the respective tool in said second sleeve.

\* \* \* \* \*